United States Patent
Kagan et al.

(10) Patent No.: US 9,696,942 B2
(45) Date of Patent: *Jul. 4, 2017

(54) ACCESSING REMOTE STORAGE DEVICES USING A LOCAL BUS PROTOCOL

(71) Applicant: Mellanox Technologies Ltd., Yokneam (IL)

(72) Inventors: Michael Kagan, Zichron Yaakov (IL); Noam Bloch, Bat Shlomo (IL); Shlomo Raikin, Moshav Ofer (IL); Yaron Haviv, Tel Mond (IL); Idan Burstein, Karmiel (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 579 days.

This patent is subject to a terminal disclaimer.

(21) Appl. No.: 14/215,097

(22) Filed: Mar. 17, 2014

(65) Prior Publication Data

US 2015/0261720 A1    Sep. 17, 2015

(51) Int. Cl.
   *G06F 15/167* (2006.01)
   *G06F 13/28* (2006.01)
   *G06F 3/06* (2006.01)
   *G06F 13/42* (2006.01)

(52) U.S. Cl.
   CPC .......... *G06F 3/0659* (2013.01); *G06F 13/287* (2013.01); *G06F 13/4221* (2013.01); *Y02B 60/1228* (2013.01); *Y02B 60/1235* (2013.01)

(58) Field of Classification Search
   USPC ............ 709/212–213, 217, 219; 710/22, 308
   See application file for complete search history.

(56) References Cited

U.S. PATENT DOCUMENTS

| | | |
|---|---|---|
| 5,003,465 A | 3/1991 | Chisholm et al. |
| 5,615,404 A | 3/1997 | Knoll et al. |
| 5,768,612 A | 6/1998 | Nelson |
| 5,864,876 A | 1/1999 | Rossum et al. |
| 5,893,166 A | 4/1999 | Frank et al. |
| 5,954,802 A | 9/1999 | Griffith |
| 6,070,219 A | 5/2000 | McAlpine et al. |
| 6,321,276 B1 | 11/2001 | Forin |
| 6,581,130 B1 | 6/2003 | Brinkmann, Jr. et al. |
| 6,701,405 B1 | 3/2004 | Adusumilli et al. |
| 6,766,467 B1 | 7/2004 | Neal et al. |
| 6,789,143 B2 | 9/2004 | Craddock et al. |
| 6,981,027 B1 | 12/2005 | Gallo et al. |
| 7,171,484 B1 | 1/2007 | Krause et al. |

(Continued)

OTHER PUBLICATIONS

U.S. Appl. No. 14/215,099 Office Action dated Dec. 15, 2015.

(Continued)

*Primary Examiner* — Christopher Shin
(74) *Attorney, Agent, or Firm* — D.Kligler IP Services Ltd.

(57) ABSTRACT

A method for data storage includes configuring a driver program on a host computer to receive commands in accordance with a protocol defined for accessing local storage devices connected to a peripheral component interface bus of the host computer. When the driver program receives, from an application program running on the host computer a storage access command in accordance with the protocol, specifying a storage transaction, a remote direct memory access (RDMA) operation is performed by a network interface controller (NIC) connected to the host computer so as to execute the storage transaction via a network on a remote storage device.

16 Claims, 5 Drawing Sheets

(56) References Cited

U.S. PATENT DOCUMENTS

| | | |
|---|---|---|
| 7,225,277 B2 | 5/2007 | Johns et al. |
| 7,263,103 B2 | 8/2007 | Kagan et al. |
| 7,299,266 B2 | 11/2007 | Boyd et al. |
| 7,395,364 B2 | 7/2008 | Higuchi et al. |
| 7,464,198 B2 | 12/2008 | Martinez et al. |
| 7,475,398 B2 | 1/2009 | Nunoe |
| 7,548,999 B2 | 6/2009 | Haertel et al. |
| 7,577,773 B1 | 8/2009 | Gandhi et al. |
| 7,752,417 B2 | 7/2010 | Manczak et al. |
| 7,809,923 B2 | 10/2010 | Hummel et al. |
| 7,921,178 B2 | 4/2011 | Haviv |
| 7,945,752 B1 | 5/2011 | Miller et al. |
| 8,001,592 B2 | 8/2011 | Hatakeyama |
| 8,010,763 B2 | 8/2011 | Armstrong et al. |
| 8,051,212 B2 | 11/2011 | Kagan et al. |
| 8,255,475 B2 | 8/2012 | Kagan et al. |
| 8,260,980 B2 | 9/2012 | Weber et al. |
| 8,447,904 B2 | 5/2013 | Riddoch |
| 8,504,780 B2 | 8/2013 | Mine et al. |
| 8,645,663 B2 | 2/2014 | Kagan et al. |
| 8,745,276 B2 | 6/2014 | Bloch et al. |
| 8,751,701 B2 | 6/2014 | Shahar et al. |
| 2002/0152327 A1 | 10/2002 | Kagan et al. |
| 2003/0046530 A1 | 3/2003 | Poznanovic |
| 2003/0120836 A1 | 6/2003 | Gordon |
| 2004/0221128 A1 | 11/2004 | Beecroft et al. |
| 2004/0230979 A1 | 11/2004 | Beecroft et al. |
| 2005/0216552 A1 | 9/2005 | Fineberg et al. |
| 2006/0259661 A1 | 11/2006 | Feng et al. |
| 2007/0011429 A1 | 1/2007 | Sangili et al. |
| 2007/0061492 A1 | 3/2007 | Van Riel |
| 2007/0226450 A1 | 9/2007 | Engbersen et al. |
| 2007/0283124 A1 | 12/2007 | Menczak et al. |
| 2008/0005387 A1 | 1/2008 | Mutaguchi |
| 2008/0147904 A1 | 6/2008 | Freimuth et al. |
| 2008/0168479 A1 | 7/2008 | Purtell et al. |
| 2008/0313364 A1 | 12/2008 | Flynn et al. |
| 2010/0030975 A1 | 2/2010 | Murray et al. |
| 2010/0095053 A1 | 4/2010 | Bruce et al. |
| 2010/0095085 A1 | 4/2010 | Hummel et al. |
| 2010/0217916 A1 | 8/2010 | Gao et al. |
| 2011/0023027 A1 | 1/2011 | Kegel et al. |
| 2011/0213854 A1 | 9/2011 | Haviv |
| 2011/0246597 A1 | 10/2011 | Swanson et al. |
| 2013/0067193 A1 | 3/2013 | Kagan et al. |
| 2013/0103777 A1 | 4/2013 | Kagan et al. |
| 2013/0311746 A1 | 11/2013 | Raindel et al. |
| 2013/0325998 A1 | 12/2013 | Hormuth et al. |
| 2014/0089450 A1 | 3/2014 | Raindel et al. |
| 2014/0089451 A1 | 3/2014 | Eran et al. |
| 2014/0089631 A1 | 3/2014 | King |
| 2014/0122828 A1 | 5/2014 | Kagan et al. |
| 2014/0181365 A1 | 6/2014 | Fanning et al. |
| 2015/0006663 A1 | 1/2015 | Huang et al. |
| 2015/0012735 A1 | 1/2015 | Tamir et al. |
| 2015/0081947 A1 | 3/2015 | Vucinic et al. |

OTHER PUBLICATIONS

"Linux kernel enable the IOMMU—input/output memory management unit support", http://www.cyberciti.biz/tips/howto-turn-on-linux-software-iommu-support.html, Oct. 15, 2007.

U.S. Appl. No. 12/430,912 Office Action dated Jun. 15, 2011.

U.S. Appl. No. 12/430,912 Office Action dated Nov. 2, 2011.

NVM Express, Revision 1.0e, 127 pages, Jan. 23, 2014.

Infiniband Trade Association, "InfiniBandTM Architecture Specification", vol. 1, Release 1.2.1, Nov. 2007.

Shah et al., "Direct Data Placement over Reliable Transports", IETF Network Working Group, RFC 5041, Oct. 2007.

Culley et al., "Marker PDU Aligned Framing for TCP Specification", IETF Network Working Group, RFC 5044, Oct. 2007.

"MPI: A Message-Passing Interface Standard", Version 2.2, Message Passing Interface Forum, Sep. 4, 2009.

Welsh et al., "Incorporating Memory Management into User-Level Network Interfaces", Department of Computer Science, Cornell University, Technical Report TR97-1620, 10 pages, Feb. 13, 1997.

Hummel M., "IO Memory Management Hardware Goes Mainstream", AMD Fellow, Computation Products Group, Microsoft WinHEC, 7 pages, 2006.

PCI Express, Base Specification, Revision 3.0, pp. 1-860, Nov. 10, 2010.

Kagan et al., U.S. Appl. No. 14/215,099, filed Mar. 17, 2014.

U.S. Appl. No. 13/471,558 Office Action dated Jun. 4, 2014.

U.S. Appl. No. 13/943,809 Office Action dated Jun. 5, 2014.

U.S. Appl. No. 13/665,946 Office Action dated Aug. 13, 2014.

Kagan et al, U.S. Appl. No. 13/943,809, filed Jul. 17, 2013.

U.S. Appl. No. 14/215,099 Office Action dated Dec. 30, 2016.

U.S. Appl. No. 14/215,099 Office Action dated Jun. 28, 2016.

ACCESSING REMOTE STORAGE DEVICES USING A LOCAL BUS PROTOCOL

CROSS REFERENCE TO RELATED APPLICATION

This application is related to another U.S. patent application, filed on even date, entitled "Storage System and Server," which is incorporated herein by reference.

FIELD OF THE INVENTION

The present invention relates generally to computer systems, and particularly to methods, systems and protocols for interaction between computers and storage devices.

BACKGROUND

Solid-state drives (SSDs) are mass-storage devices that use integrated circuit memory—typically NAND-based flash memory—to store data while providing an interface that emulates traditional hard disk drives (HDDs). By comparison with HDDs, SSDs offer faster access, lower latency, and greater resistance to environmental disturbances. Therefore, SSDs are gradually replacing HDDs in many storage applications.

Because SSDs were originally designed to take the place of HDDs, they have generally used the same sorts of input/output (I/O) buses and protocols as HDDs, such as SATA, SAS and Fibre Channel. More recently, however, SSDs have become available that connect directly to the peripheral component interface bus of a host computer, such as the PCI Express® (PCIe®) bus. For this purpose, the NVMe Work Group has developed the NVM Express (NVMe) specification (available on-line at nvmexpress.org), which defines a register interface, command set and feature set for PCI Express SSDs.

Advanced network interface controllers (NICs) are designed to support remote direct memory access (RDMA) operations, in which the NIC transfers data by direct memory access from the memory of one computer into that of another without involving the central processing unit (CPU) of the target computer. Although RDMA is generally used to transfer data to and from host memory (RAM), a number of attempts to adapt RDMA functionality for reading and writing data directly to and from an SSD have been described in the patent literature. For example, U.S. Patent Application Publication 2008/0313364 describes a method for remote direct memory access to a solid-state storage device, which is said to allow direct access between memory of a client connected through a network to such a device. Similarly U.S. Patent Application Publication 2011/0246597 describes a system in which a network interface component of a server may access a solid-state storage module of the server by a network storage access link that bypasses a central processing unit (CPU) and main memory of the server.

SUMMARY

Embodiments of the present invention that are described hereinbelow provide apparatus and methods that enhance the abilities of applications running on a host computer to access remote storage devices over a network.

There is therefore provided, in accordance with an embodiment of the present invention, a method for data storage, which includes configuring a driver program on a host computer to receive commands in accordance with a protocol defined for accessing local storage devices connected to a peripheral component interface bus of the host computer. The driver program receives from an application program running on the host computer a storage access command in accordance with the protocol, the command specifying a storage transaction. Responsively to the received storage access command, a remote direct memory access (RDMA) operation is initiated, to be performed by a network interface controller (NIC) connected to the host computer so as to execute the storage transaction via a network on a remote storage device.

In a disclosed embodiment, the protocol is an NVM Express protocol, and the storage device includes a solid-state drive (SSD).

Typically the host computer has a host memory and the storage device has a device memory. In some embodiments, receiving the command includes posting the command in a submission queue in the host memory, and initiating the RDMA operation includes writing a mirror of the submission queue, via the network, to the device memory. Initiating the RDMA operation may include writing, from the NIC via the network, to a doorbell register of the storage device, so as to cause the storage device to read the command from the mirror of the submission queue and carry out the storage transaction responsively to the command. Additionally or alternatively, when the storage access command includes a write command to be carried out by the host computer, writing the mirror may include selecting a buffer in the device memory and incorporating a pointer to the buffer in the write command in the mirror of the submission queue, and initiating the RDMA operation includes invoking an RDMA write operation by the NIC to the selected buffer.

In some embodiments, the method includes receiving via the network from the storage device, after the storage device has committed the storage transaction, a completion notification, written by the NIC connected to the host computer to a completion queue in the host memory. Receiving the completion notification may include detecting, in a further NIC connected to the remote storage device, a completion entry posted by the storage device, and transmitting the completion notification, in response to the detected completion entry, from the NIC connected to the remote storage device to the NIC that is connected to the host computer.

In a disclosed embodiment, the storage access command includes a read command to be carried out by the host computer, and initiating the RDMA operation includes invoking an RDMA write operation to be performed by the remote storage device via the NIC to a host memory of the host computer. In another embodiment, the storage access command includes a write command to be carried out by the host computer, and initiating the RDMA operation includes invoking an RDMA read operation to be performed by the remote storage device via the NIC from a host memory of the host computer.

In some embodiments, the storage access command includes a scatter/gather list specifying a non-contiguous set of memory ranges in a host memory of the host computer, and initiating the RDMA operation includes mapping the memory ranges to a contiguous range of virtual memory in the NIC, and causing the storage device to execute the storage transaction with reference to the contiguous range. Typically, causing the storage device to execute the storage transaction includes invoking an RDMA operation to be performed by the remote storage device with reference to the contiguous range of the virtual memory. Additionally or alternatively, causing the storage device to execute the storage transaction includes mapping the contiguous range to a buffer in the device memory, for use by the storage device in the storage transaction.

In one embodiment, initiating the RDMA operation includes submitting, by the driver program, an RDMA command to the NIC in order to execute the storage transaction.

In another embodiment, initiating the RDMA operation includes passing the storage access command from the driver program to the NIC, and identifying and executing the RDMA operation in the NIC in response to the storage access command. Passing the storage access command from the driver program to the NIC may include exposing, by the NIC, an interface on peripheral component interface bus that is compliant with the protocol defined for accessing local storage devices.

There is also provided, in accordance with an embodiment of the present invention, a data storage system, which includes a storage server, including non-volatile memory (NVM) and a server network interface controller (NIC), which couples the storage server to a network. A host computer includes a host central processing unit (CPU), a host memory and a host NIC, which couples the host computer to the network. The host computer runs a driver program that is configured to receive, from processes running on the host computer, commands in accordance with a protocol defined for accessing local storage devices connected to a peripheral component interface bus of the host computer, and upon receiving a storage access command in accordance with the protocol, to initiate a remote direct memory access (RDMA) operation to be performed by the host and server NICs so as to execute on the storage server, via the network, a storage transaction specified by the command.

There is additionally provided, in accordance with an embodiment of the present invention, computing apparatus, including a network interface controller (NIC), which is configured to couple the apparatus to a network, a host memory, and a central processing unit (CPU). The CPU runs a driver program that is configured to receive, from processes running on the host computer, commands in accordance with a protocol defined for accessing local storage devices connected to a peripheral component interface bus of the host computer, and upon receiving a storage access command specifying a storage transaction in accordance with the protocol, to initiate a remote direct memory access (RDMA) operation to be performed by the NIC so as to execute the storage transaction via a network on a remote storage device.

In one embodiment, the driver program is configured to initiate the RDMA operation by submitting an RDMA command to the host NIC in response to the storage access command. In another embodiment, the driver program is configured to pass the storage access command to the host NIC, and the host NIC is configured to identify and execute the RDMA operation in response to the storage access command.

There is further provided, in accordance with an embodiment of the present invention, a computer software product, including a non-transitory computer-readable medium in which program instructions are stored, which instructions, when read by a computer that is coupled to a network by a network interface controller (NIC), cause the computer to run a driver program that is configured to receive, from processes running on the computer, commands in accordance with a protocol defined for accessing local storage devices connected to a peripheral component interface bus of the computer, and upon receiving from one of the processes a storage access command specifying a storage transaction in accordance with the protocol, to initiate a remote direct memory access (RDMA) operation to be performed by the NIC so as to execute the storage transaction via the network on a remote storage device.

There is moreover provided, in accordance with an embodiment of the present invention, a storage server, including a server memory, a network interface controller (NIC), which is configured to couple the server to a network and to receive and transmit data to and from the server memory in remote direct memory access (RDMA) operations via the network, and an array of non-volatile memory (NVM). A controller is configured to read from the server memory commands from a queue in accordance with a protocol defined for accessing local storage devices connected to a peripheral component interface bus of the server, wherein the queue is reflected by a remote host computer via the NIC to the server memory, and upon reading from the queue a storage access command specifying a storage transaction in accordance with the protocol, to initiate a remote direct memory access (RDMA) operation to be performed by the NIC so as to execute the storage transaction by exchanging data via the network with the host computer.

There is furthermore provided, in accordance with an embodiment of the present invention, a network interface controller, including a network interface, which is configured to be connected to a network and to convey data packets, via the packet network, to and from a storage server on the network. A host interface is configured to be connected to a peripheral component interface bus of the host computer while exposing a storage interface on the bus. Processing circuitry is configured to receive, via the host interface, commands in accordance with a protocol defined for accessing local storage devices connected to the peripheral component interface bus of the host computer, and upon receiving a storage access command in accordance with the protocol, to initiate a remote direct memory access (RDMA) operation to be performed via the network interface so as to execute on the storage server, via the network, a storage transaction specified by the command.

The host interface may be configured to expose a network communication interface on the bus in addition to exposing the storage interface.

The present invention will be more fully understood from the following detailed description of the embodiments thereof, taken together with the drawings in which:

DETAILED DESCRIPTION OF EMBODIMENTS

Local storage protocols, such as NVMe, provide a simple, fast, and convenient means for application programs running on a host computer to access local storage devices connected to a peripheral component interface bus of the host computer. Accessing remote storage devices over a network, however, can be substantially more complicated: Typically, the client program must send a request over the network to the CPU of the storage server, which processes the request and translates it into the appropriate command to the storage drive (such as an HDD or SSD) on the server. When the storage transaction has been completed and committed, the CPU sends an acknowledgment and/or data (in the case of a read transaction) over the network back to the client.

Embodiments of the present invention that are described hereinbelow simplify this process by enabling applications to access remote storage devices over a network using a protocol, such as NVMe, that is defined for accessing local storage devices via the peripheral component interface bus. A driver program running on the host computer and a NIC that connects the host computer to the network operate together to receive storage access commands in accordance with the protocol, and to translate the storage transactions that they invoke into RDMA operations that are performed between the NICs of the host computer and the remote storage device. The translation is transparent to the application program that submits the commands, and enables the storage server to execute the commands, as well, in a manner compatible with the local storage protocol with only minimal modification to the server software.

Furthermore, because the exchange of data and control information between the host computer and storage device is carried out by RDMA, only minimal involvement is required by the CPUs of the host computer and the storage server. Most of the control functions are offloaded to the NICs, and CPU involvement is typically limited to handling one or a few RDMA operations per storage transaction. In one embodiment, the NIC of the storage server is configured to offload all of the control functions on the storage server side, so that the storage server CPU need not be aware of the transactions at all. Such approaches enhance system efficiency and save power and computing resources, and may obviate the need for a high-capacity CPU in the storage server.

Figure 1:
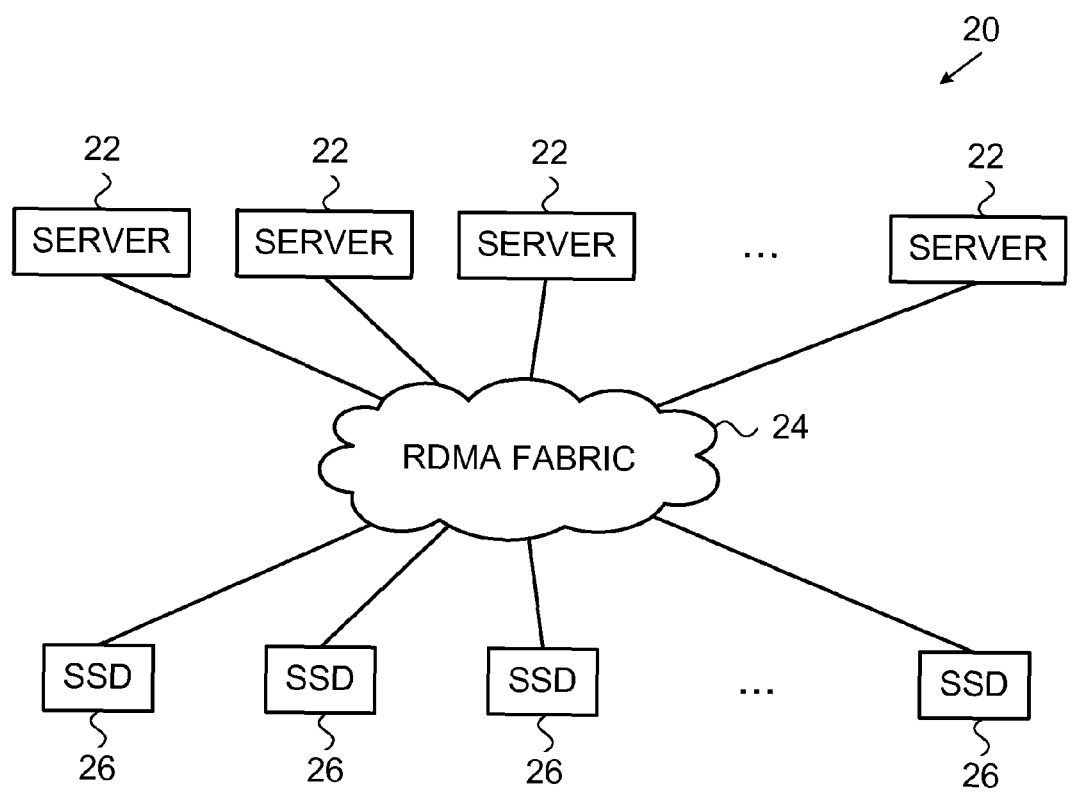
FIG. 1 is a block diagram that schematically illustrates a computer system with network-based storage, in accordance with an embodiment of the present invention.

FIG. 1 is a block diagram that schematically illustrates a computer system 20 with network-based storage, in accordance with an embodiment of the present invention. In the pictured system, one or more host computers 22 communicate via a network 24 with one or more storage servers 26. Network 24 comprises a switch fabric, which is capable of carrying RDMA traffic, such as an InfiniBand® or suitably-configured Ethernet® fabric. Host computers 22 in this example are configured as application servers, with suitable driver software to enable applications to use the NVMe protocol for storage access; while storage servers 26 comprise SSDs that are likewise equipped with NVMe interfaces.

For the sake of clarity and convenience, the embodiments that are described hereinbelow make reference specifically to SSDs and to features of the NVMe protocol for interacting with such SSDs. The principles of the present invention, however, may similarly be applied in systems comprising other sorts of data storage devices, such as optical and magnetic disks. Additionally or alternatively, these principles may be applied to support remote implementation of protocols other than NVMe for accessing local storage devices, whether such protocols are designed for the PCIe bus or for other sorts of peripheral component interface busses that may be known in the art.

Figure 2:
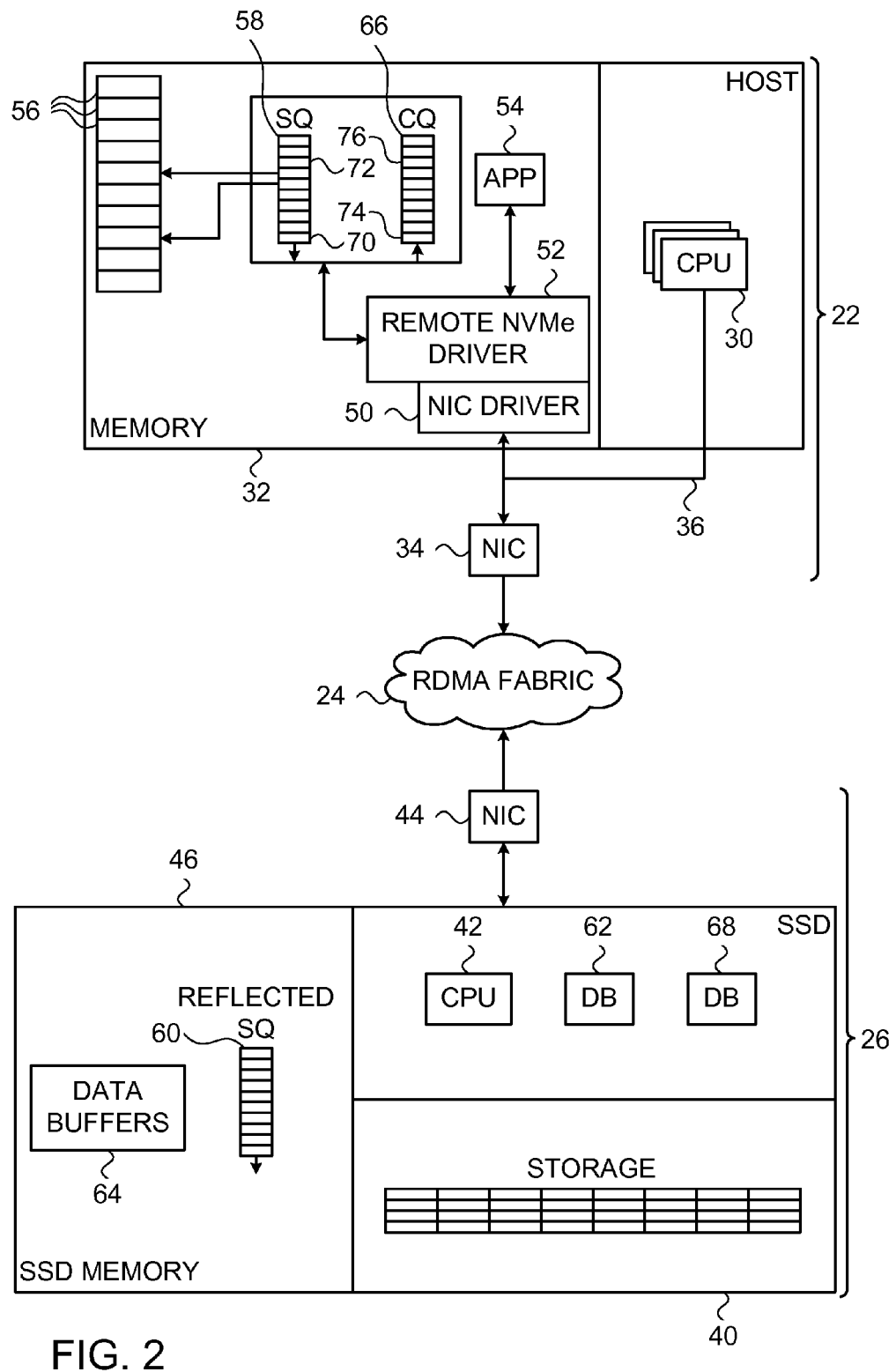
FIG. 2 is a block diagram showing details of host and storage servers, in accordance with an embodiment of the present invention.

FIG. 2 is a block diagram showing details of host computer 22 and storage server 26, in accordance with an embodiment of the present invention. Although for the sake of simplicity, this figure and the description that follows refer only to a single host computer interacting with a single storage server, the principles of the embodiments described hereinbelow may similarly be applied in one-to-many, many-to-one, and many-to-many host/storage configurations, such as that shown in FIG. 1.

Host computer 22 comprises a central processing unit (CPU) 30, typically comprising one or more processing cores, and a host memory 32, comprising random access memory (RAM). A network interface controller (NIC) 34 couples host computer 22 to network 24 and is typically connected to CPU 30 and memory 32 by a local bus 36, such as a PCIe bus. For this purpose, NIC 34 has a host interface (such as a PCIe interface) connected to bus 36 and a network interface (such as an InfiniBand or Ethernet interface) connected to network 24, with suitable processing circuitry between these interfaces to carry out the data transfer functions that are described herein.

Storage server 26 comprises a storage array 40, such as flash or other non-volatile memory, and a CPU 42, which communicates with network 24 via a NIC 44. CPU 42 may serve as the controller of storage array 40, or the array may alternatively have its own, dedicated storage controller (not shown). Server 26 likewise comprises a local memory 46, such as RAM, which is used for temporary storage of commands and data, as described below.

Network operations by applications and other processes running on host computer 22 are handled by a NIC driver program 50, which receives work requests from such processes and places corresponding work queue elements (WQEs) in send and receive queues for processing by NIC 34. The WQEs cause the NIC to send and receive packets over network 24, and specifically to perform RDMA transfers to and from other nodes on network 24. Such RDMA operations are carried out by NIC 34 and NIC 44 in accordance with well-known protocols, such as InfiniBand and RDMA over Converged Ethernet (RoCE).

An additional remote NVMe driver program 52 handles NVMe storage access commands submitted by processes running on host computer 22, such as a user application 54, and generates corresponding RDMA work requests to NIC driver program 50, which queues corresponding RDMA WQEs as described above. These WQEs, when executed by NIC 34, cause the storage transactions invoked by the commands to be carried out on storage server 26, resulting generally in writing data to or reading data from storage array 40. In other words, application 54 submits commands NVMe commands to driver 52 as though it was writing to or reading from an SSD on bus 36; but driver program 52 causes the commands to be executed on server 26, via network 24, by submitting appropriate RDMA commands via driver program 50 to NIC 34.

In an alternative embodiment, NIC 34 itself is configured to receive NVMe commands submitted by an NVMe driver program and to autonomously identify and execute the RDMA operations necessary to carry out the commands. In this case, in other words, there is no need for an intervening NIC driver program 50 in computer 22 in order to support NVMe storage access operations via network 24. For this purpose, NIC 34 may expose a storage interface on bus 36, presenting itself as a storage device, in addition to, or even instead of, the network communication interface that it would normally expose. The storage and NIC interfaces occupy certain, respective address ranges on the bus. For an SSD on the PCIe bus, for example, the NVMe specification defines a class code, which identifies the address range in question as an NVMe-compliant device and will cause the PCIe driver to recognize NIC 34 as such a storage device. A standard NVMe driver running on CPU 30 will then send NVMe commands to the address range of the NVMe storage interface of NIC 34, without requiring the services of NIC driver 50 for this purpose.

CPU 30 typically comprises a general-purpose computer processor, and the programs running on computer 22, including driver programs 50 and 52 and application 54, are implemented as software components. This software may be downloaded to computer 22 in electronic form, over a network, for example. Additionally or alternatively, the software may be stored on non-transitory computer-readable media, such as optical, magnetic, or electronic memory media.

Figure 3:
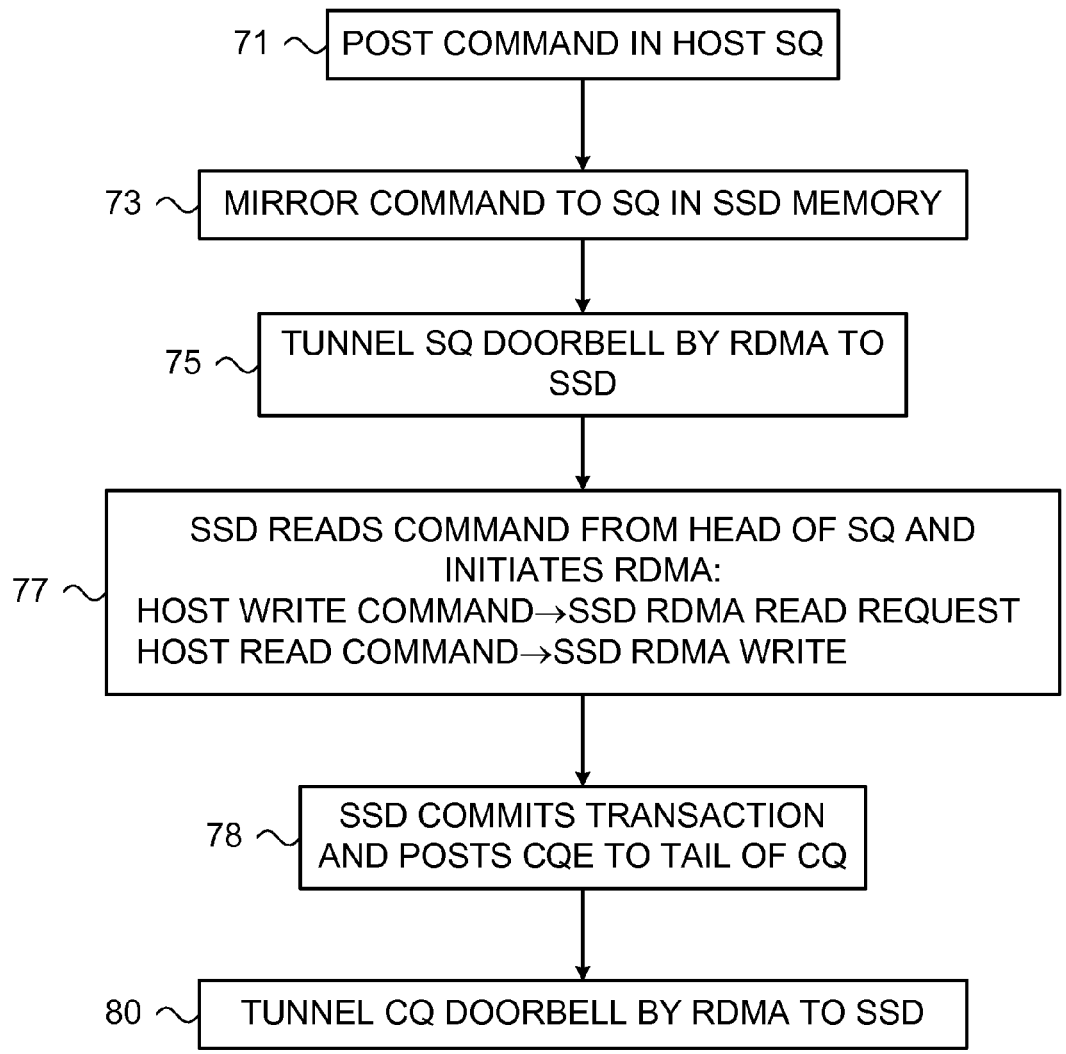
FIG. 3 is a flow chart that schematically illustrates a method for network-based storage access, in accordance with an embodiment of the present invention.

FIG. 3 is a flow chart that schematically illustrates a method for network-based storage access, in accordance with an embodiment of the present invention. For convenience and clarity, this method will be described specifically with reference to the elements of system 20 that are shown in FIG. 2. More generally, however, the method of FIG. 3 may be carried out in other storage systems, using other suitable protocols and devices that support storage access and RDMA. For brevity, driver programs 50 and 52 may be referred to hereinbelow simply as "drivers" 50 and 52.

The method of FIG. 3 is initiated when application 54 submits a storage command, such as a read or write command, directed to SSD storage array 40, in a command submission step 71. The commands are posted to a submission queue (SQ) 58 in memory 32. (Although SQ 58 and the completion queue described below are shown as linear queues, in practice they may be implemented as circular queues, as provided in the NVMe specification.) Typically, each entry in SQ 58 includes a scatter/gather list (SGL), which points to one or more buffers 56 in memory 32 from which data are to be read or written in the storage access transaction. Each new command is written to a tail 72 of SQ 58, and is then executed when it has advanced to a head 70 of the SQ.

To enable local execution of the commands on storage server 26, driver 52 initiates one or more RDMA write operations via network 24 to create a mirror of submission queue 58 in memory 46 of server 26, at a reflection step 73. This mirrored queue is shown in FIG. 2 as a reflected SQ 60. The entries in reflected SQ 60 contain corresponding pointers to data buffers 64 in memory 46, to and from which NIC 34 and NIC 44 will subsequently transfer data.

After posting a new entry in SQ 58, driver 52 initiates another RDMA operation by NIC 34 to ring the doorbell of SSD storage array 40, at a doorbell tunneling step 75. This step causes NIC 34 to write an entry by RDMA via network 24 and NIC 44 to a submission doorbell register 62 of the storage array. This step is referred to as "tunneling" because doorbell ringing is normally carried out by writing to a designated register address on the local bus, such as the PCIe bus. In this case, however, the RDMA operation carried out by NIC 34 is directed through network 24 to the doorbell address on the PCIe bus in server 26.

Writing to doorbell register 62 causes the controller of storage array 40 to read the next command from the head of reflected SQ 60, at a command execution step 77. To carry out the storage transaction, CPU 42 submits a WQE to NIC 44, which then performs an appropriate RDMA operation to carry out the data transfer invoked by the original command that application 54 submitted on host computer 22. Specifically, when the storage access command comprises a read command to be carried out by host computer 22, the corresponding RDMA operation initiated by NIC 44 is an RDMA write operation. This write operation will cause NIC 44 to copy the designated data from the memory of storage server 26 via NIC 34 to the appropriate buffer or buffers 56 in host memory 32 of host computer 22.

On the other hand, when the storage access command in reflected SQ 60 comprises a write command to be carried out by host computer 22, NIC 44 initiates an RDMA read operation. In this case, NIC 44 sends an RDMA read request over network 24 to NIC 34, specifying the buffer or buffers 56 in host memory 32 from which data are to be read. NIC 34 copies the data from memory 32 and transmits an RDMA read response containing the data to NIC 44, which then writes the data to the appropriate location in the memory of storage server 26.

Typically, in RDMA operations performed on server 26, NIC 44 reads data from or writes data to buffers 64 in memory 46. A memory manager (not shown) copies such data to and from storage array 40 as is known in the art. Alternatively, however, server 26 may be configured so that NIC 44 is able to read and write data directly from and to storage array 40. Devices and methods that may be used for this purpose are described, for example, in U.S. patent application Ser. No. 13/943,809, filed Jul. 17, 2013, which is assigned to the assignee of the present patent application and whose disclosure is incorporated herein by reference.

To signal to application 54 that the requested storage transaction has been completed and committed, server 26 posts a completion notification, in the form of an entry in a completion queue (CQ) 66 in host memory 32, at a completion step 78. This step is also carried out by RDMA, with NIC 44 writing the entry via network 24 through NIC 34 to the address in memory 32 of a tail 74 of CQ 66. Upon writing a new completion entry to CQ 66, NIC 34 may raise an interrupt to notify CPU 30. The CPU reads the completion entries from a head 76 of CQ 66, and application 54 proceeds accordingly.

The NVMe specification requires that the client inform the SSD controller when it has consumed an entry from head 76 of CQ 66. For this purpose, driver 52 may instruct NIC to perform a further RDMA operation to write to a completion doorbell register 68 of storage array 40, at a further doorbell tunneling step 80. The completion doorbell informs the SSD controller that the head of CQ 66 has advanced.

Figure 4:
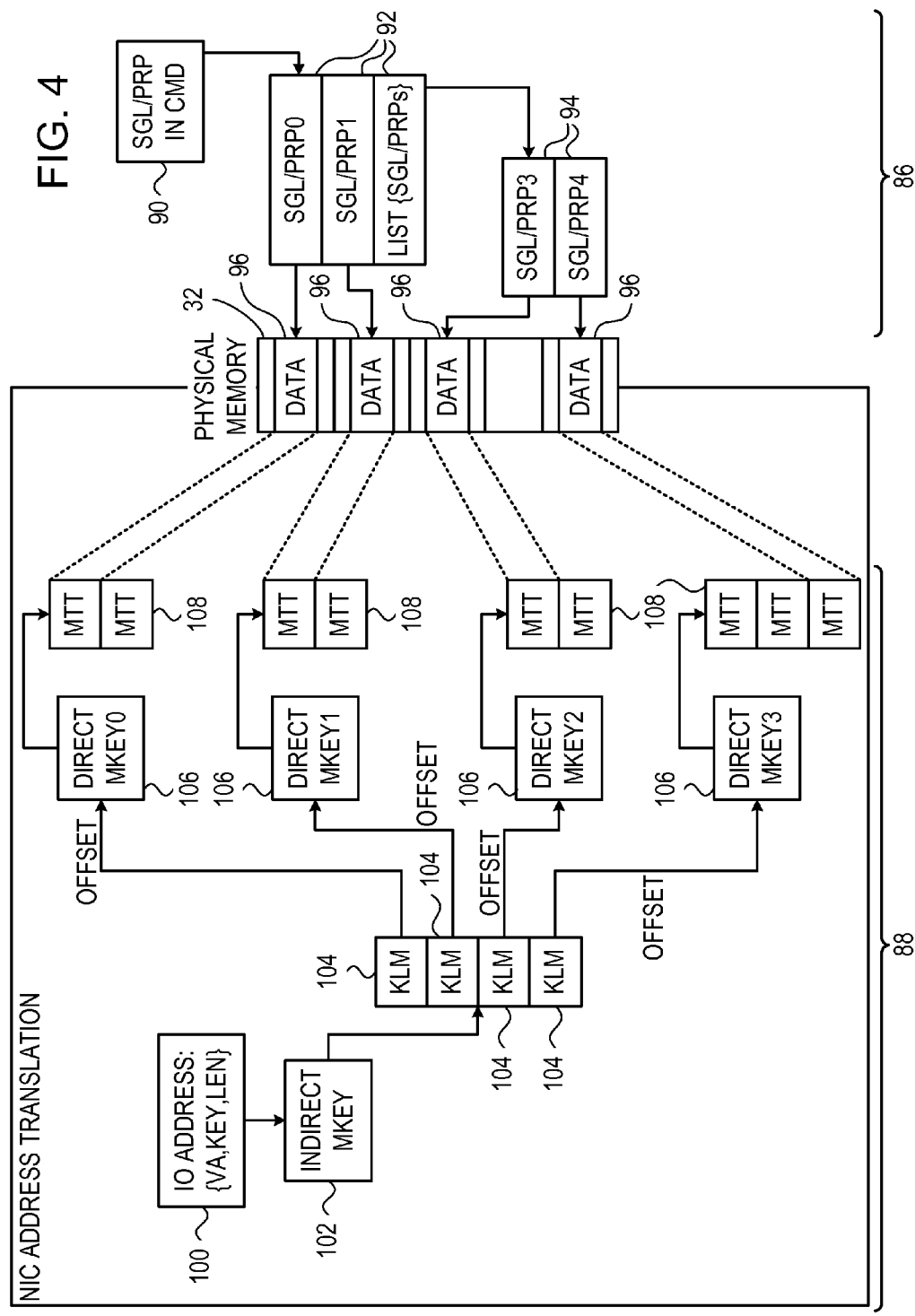
FIG. 4 is a block diagram that schematically illustrates data structures used in network-based storage access, in accordance with an embodiment of the present invention.

FIG. 4 is a block diagram that schematically illustrates data structures 86 and 88 that may be used in specifying data buffers 56 for purposes of NVMe operations in system 20, in accordance with an embodiment of the present invention. Application 54 uses data structures 86 to specify buffers 56 for data transfer in accordance with the NVMe specification, while NICs 34 and 44 use data structures 88 in identifying the data for RDMA transfer.

As shown in FIG. 4, scatter/gather lists (SGLs) 90, 92, 94, . . . , of NVMe storage access commands specify a non-contiguous set of physical memory ranges 96, known as physical region pages (PRPs), in host memory 32 of computer 22. Specifically, each command refers to a base SGL/PRP 90, which may contain a list of additional SGL/PRPs 92, and these SGL/PRPs may contain a further list of SGL/PRPs, and so forth. Each SGL/PRP that does not contain a list of SGL/PRPs points to one of memory ranges 96. As shown in the figure, physical memory ranges 96 are typically (although not necessarily) non-contiguous.

NIC 34 maps physical ranges 96 to a contiguous range 100 of virtual memory. This mapping may use, for example, the methods for mapping of virtual memory by a NIC that are described in U.S. Pat. No. 8,255,475, whose disclosure is incorporated herein by reference. NICs 34 and 44 specify this contiguous virtual memory range 100 in the RDMA packets that they transmit and receive, thus simplifying the commands and data transfer operations that are handled by storage server 26. Range 100 is specified by an input/output (IO) address, which defines a (base) virtual address (VA), a key for purposes of memory protection, and a length (LEN). This key is an indirect memory key (Mkey) 102, which may point to multiple subranges 104 of virtual memory, each with its own key (K), length (L) and virtual address offset (M). The number of subranges 104 typically corresponds to the number of physical memory ranges 96 specified by SGLs 90, 92, 94, . . . .

The keys of subranges 104 are direct memory keys 106, which point to memory translation tables (MTTs) 108. These tables translate virtual memory subranges 104 into corresponding physical memory ranges 96. NIC 34 maintains a record of the various MTTs and keys, and uses them in translating between virtual IO addresses that are specified in RDMA transactions on network 24 and the physical addresses of buffers 56 in memory 32. Commands in reflected SQ 60 may also be specified in terms of these address values. As a result, the RDMA read and write operations initiated by NIC 44 at step 77, as described above, may be specified in terms of contiguous ranges in the virtual IO address space of NIC 34, which performs the necessary translation between virtual and physical memory addresses in a manner transparent to NIC 44.

The use of virtual addressing that is described above simplifies the commands and communication between the NICs themselves and between the NICs and the respective driver programs on computer 22 and server 26. Alternatively, however, the techniques for remote implementation of local storage commands that are described above may be carried out using the physical memory addressing scheme of NVMe (or of any other suitable storage protocol) throughout, without remapping of memory addresses by the NICs.

Figure 5:
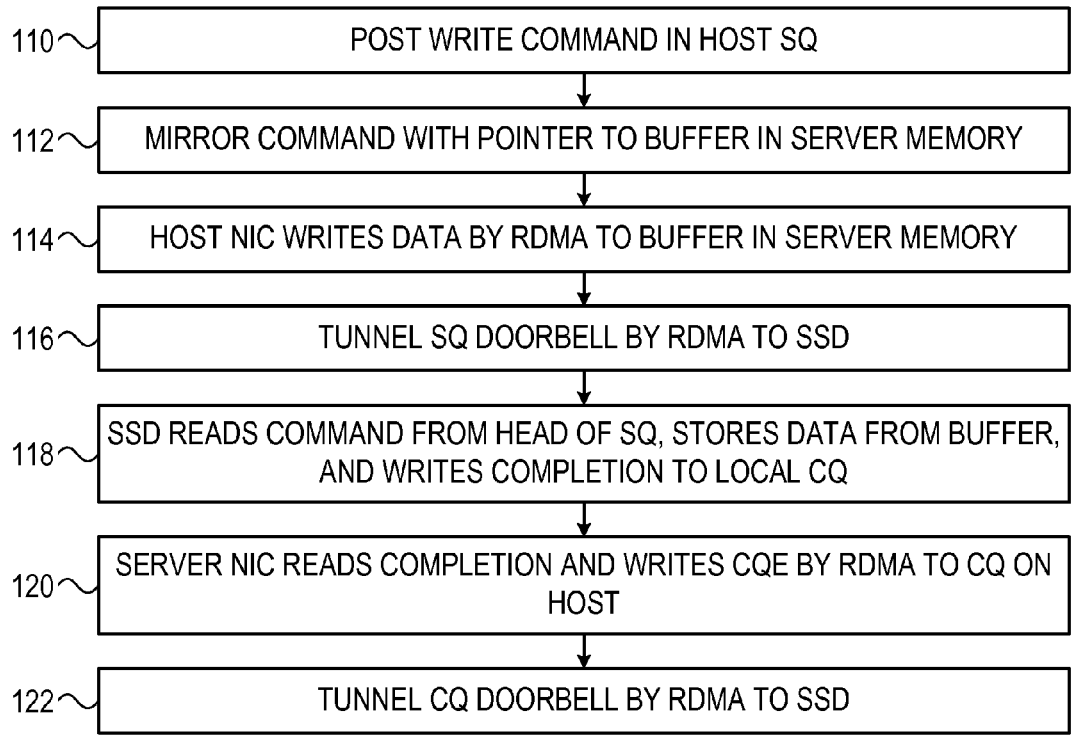
FIGS. 5 and 6 are flows chart that schematically illustrates a method for network-based storage access, in accordance with an alternative embodiment of the present invention.
Figure 6:
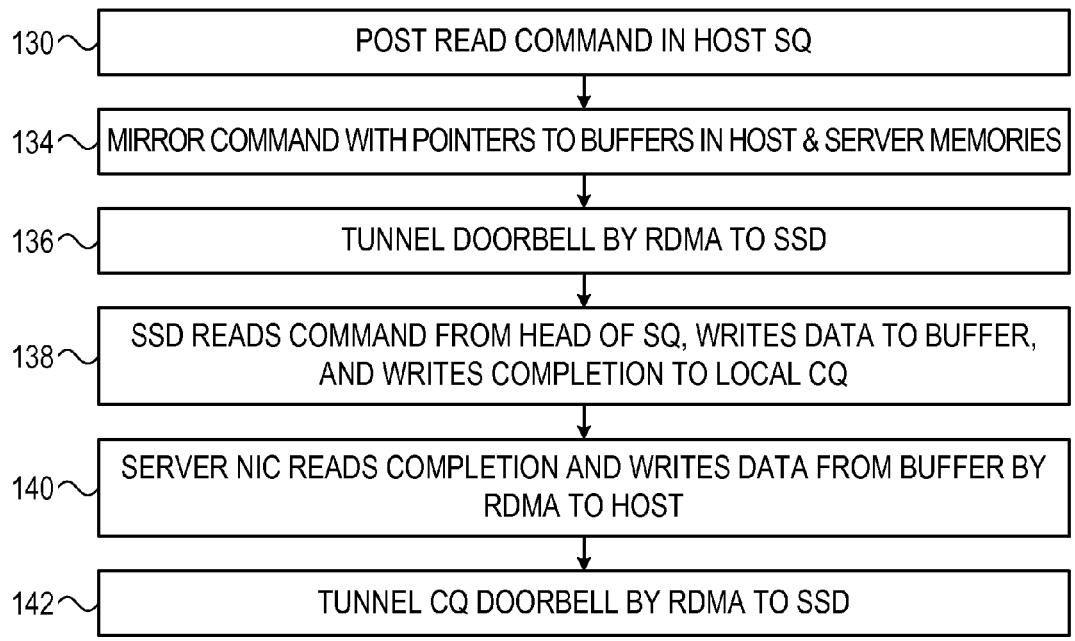

FIGS. 5 and 6 are flow charts that schematically illustrate methods for network-based storage access, in accordance with an alternative embodiment of the present invention. FIG. 5 illustrates execution of a write command from host computer 22 to storage server 26, while FIG. 6 illustrates execution of a read command. In this embodiment, the embedded controller of SSD storage array 40 is assumed to support standard NVMe functionality, while NIC 44 of storage server 26 comprises suitable logic (which may be hard-wired or implemented in software on an embedded processor, such as a RISC core in the NIC) to perform the server-side functions that are outside the scope of standard NVMe functionality. The methods of FIGS. 5 and 6 are modified, relative to the methods described above, to operate in this hardware constellation, so that application 54 is enabled to write and read data to and from storage array 40 without any involvement by CPU 42 in server 26.

The method of FIG. 5 is initiated when application 54 submits an NVMe write command to SQ 58 on host computer 22, at a command submission step 110. This write command specifies one or more buffers 56 in host memory 32 that contain the data to be transferred to storage server 26. Drivers 52 and 50 instruct NIC 34 to mirror the command by RDMA to reflected SQ 60 in server memory 46, at a command reflection step 112. Using the technique described above with reference to FIG. 4, the addresses in the SGL of the original write command are mapped to a single, contiguous virtual address range for use by NIC 34. The command written by NIC 34 to reflected SQ 60 likewise contains a single pointer to a corresponding, contiguous physical address range in data buffer 64 in server memory 46. NIC driver 50 instructs NIC 34 to write the data from buffers 56 to this contiguous range in buffer 64 by RDMA, at a data transfer step 114.

After completing the RDMA write operation at step 114, driver 50 instructs NIC 34 to write to SQ doorbell register of server 26, at a doorbell tunneling step 116, as described above. "Ringing the doorbell" in this manner will cause the controller of storage array 40 to read the next command from SQ 60, and to execute the command by copying data from the designated range in data buffer 64 to the storage array, at a command execution step 118. Upon completing execution of the command, the storage array controller writes a completion entry to the NVMe completion queue in memory 46 (not shown).

NIC 44 of server 26 detects this completion entry shortly after it is posted, at a completion reading step 120. For this purpose, NIC 44 may, for example, regularly poll the completion queue for new entries. Alternatively, the location of the completion queue to which the controller of storage array 40 is programmed to write completion entries may be mapped to a doorbell register of NIC 44, in order to alert the NIC whenever a new entry is posted. In either case, upon detecting and reading the completion entry, NIC 44 writes a corresponding entry by RDMA to CQ 66 in host memory 32. The completion is reported to application 54, which then submits a completion doorbell to driver 52, which in turn causes NIC 34 to tunnel the completion doorbell to CQ doorbell register 68 on server 26, at a further doorbell tunneling step 122.

The method of FIG. 6 is initiated when application 54 submits an NVMe read command to SQ 58 on host computer 22, at a command submission step 130. Drivers 52 and 50 cause NIC 34 to mirror the command by RDMA to reflected SQ 60, again with a pointer to a specified, contiguous range in buffer 64 in server memory 46, at a command reflection step 134. In addition, in preparation for transfer of the requested data from server 26, NIC driver 50 maps the buffers specified in the SGL submitted with the NVMe read command at step 130 to a contiguous range of virtual address space in host memory 32. A pointer to this range is inserted in the command that is reflected to server 26 at step 134. (The pointer may be incorporated in the mirrored NVMe command as "opaque data," which is ignored by the storage controller but will be available to NIC 44 subsequently.) The memory translation tables maintained by NIC 34 will hold a pointer or pointers from this virtual memory range to buffers 56 in host memory 32 that were specified in the SGL.

Once these preparatory steps are completed, driver 50 instructs NIC 34 to write to SQ doorbell register 62 of server 26, at a doorbell tunneling step 136, as described above. Ringing the doorbell again causes the controller of storage array 40 to read the next command from SQ 60, and to execute the command by copying the specified data from the storage array to the designated range in data buffer 64, at a command execution step 138. The storage array controller then writes a completion entry to the NVMe completion queue in memory 46.

Upon reading the completion entry, as described above, NIC 44 of server 26 reads the data from the designated range in buffer 64 and transmits the data over network 24 to NIC 34, at a data transmission step 140. For example, NIC 44 may read the pointer to the contiguous address range in host memory 32 that was incorporated in the mirrored command at step 134 and uses this pointer in transmitting the data by RDMA write request to NIC 34. Upon receiving the RDMA write request, NIC 34 performs the required address translation and thus writes the data to the appropriate buffers 56 in host memory 32, as specified by the SGL in the original NVMe command at step 130.

After transmitting the data at step 140, NIC 44 writes an appropriate completion entry by RDMA to CQ 66 in host memory 32. The completion is reported to application 54, which accesses the data in buffers 56 and submits a completion doorbell to driver 52. As explained above, NIC 34 tunnels the completion doorbell to CQ doorbell register 68 on server 26, at a further doorbell tunneling step 142.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data storage, comprising:
   exposing a storage interface of a network interface controller (NIC) on a peripheral component interface bus of the host computer;
   configuring the NIC to handle memory access commands in accordance with a protocol defined for accessing local storage devices, relating to addresses within a specific address range;
   receiving in the NIC, from an application program running on the host computer, a storage access command in accordance with the protocol, the command specifying a storage transaction; and
   responsively to the received storage access command, initiating, by the NIC, a remote direct memory access (RDMA) operation to execute the storage transaction via a network on a remote storage device.

2. The method according to claim 1, wherein the protocol is an NVM Express protocol.

3. The method according to claim 1, wherein the remote storage device comprises a solid-state drive (SSD).

4. The method according to claim 1, wherein the host computer has a host memory and the remote storage device has a device memory, wherein receiving the command comprises posting the command in a submission queue in the host memory, and wherein initiating the RDMA operation comprises writing a mirror of the submission queue, via the network, to the device memory.

5. The method according to claim 4, wherein initiating the RDMA operation comprises writing, from the NIC via the network, to a doorbell register of the remote storage device, so as to cause the remote storage device to read the command from the mirror of the submission queue and carry out the storage transaction responsively to the command.

6. The method according to claim 4, wherein the storage access command comprises a write command to be carried out by the host computer, and wherein writing the mirror comprises selecting a buffer in the device memory and incorporating a pointer to the buffer in the write command in the mirror of the submission queue, and wherein initiating the RDMA operation comprises invoking an RDMA write operation by the NIC to the selected buffer.

7. The method according to claim 4, and comprising after the remote storage device has committed the storage transaction, receiving via the network from the remote storage device a completion notification, written by the NIC connected to the host computer to a completion queue in the host memory, in accordance with the protocol defined for accessing local storage devices.

8. The method according to claim 7, wherein receiving the completion notification comprises detecting, in a further NIC connected to the remote storage device, a completion entry posted by the remote storage device, and transmitting the completion notification, in response to the detected completion entry, from the further NIC connected to the remote storage device to the NIC that is connected to the host computer.

9. The method according to claim 1, wherein the storage access command comprises a read command to be carried out by the host computer, and wherein initiating the RDMA operation comprises invoking an RDMA write operation to be performed by the remote storage device via the NIC to a host memory of the host computer.

10. The method according to claim 1, wherein the storage access command comprises a write command to be carried out by the host computer, and wherein initiating the RDMA operation comprises invoking an RDMA read operation to be performed by the remote storage device via the NIC from a host memory of the host computer.

11. The method according to claim 1, wherein the storage access command comprises a scatter/gather list specifying a non-contiguous set of memory ranges in a host memory of the host computer, and wherein initiating the RDMA operation comprises mapping the memory ranges to a contiguous range of virtual memory in the NIC, and causing the remote storage device to execute the storage transaction with reference to the contiguous range.

12. The method according to claim 11, wherein causing the remote storage device to execute the storage transaction comprises invoking an RDMA operation to be performed by the remote storage device with reference to the contiguous range of the virtual memory.

13. The method according to claim 11, wherein the host computer has a host memory and the remote storage device has a device memory, and wherein causing the remote storage device to execute the storage transaction comprises mapping the contiguous range to a buffer in the device memory, for use by the remote storage device in the storage transaction.

14. Computing apparatus, comprising:
   a host memory;
   a central processing unit (CPU);
   a peripheral component interface bus connecting the host CPU to peripheral components; and
   a network interface controller (NIC), which is configured to expose a storage interface on the peripheral component interface bus, configured to receive, from processes running on the CPU, commands in accordance with a protocol defined for accessing local storage devices connected to the peripheral component interface bus, relating to addresses within a specific address range, and upon receiving a storage access command in accordance with the protocol defined for accessing local storage devices, to initiate a remote direct memory access (RDMA) operation instructing a storage server, via the network, to execute a storage transaction specified by the command.

15. The apparatus of claim 14, wherein the NIC exposes on the peripheral component interface bus, both a NIC interface and the storage interface, each having a respective address range.

16. The method of claim 1, wherein the NIC exposes on the peripheral component interface bus, both a NIC interface and the storage interface, each having a respective address range.

* * * * *